Dec. 1, 1925.
L. N. JONES
CARPENTER'S TOOL
Filed March 3, 1925
1,563,495
2 Sheets-Sheet 1
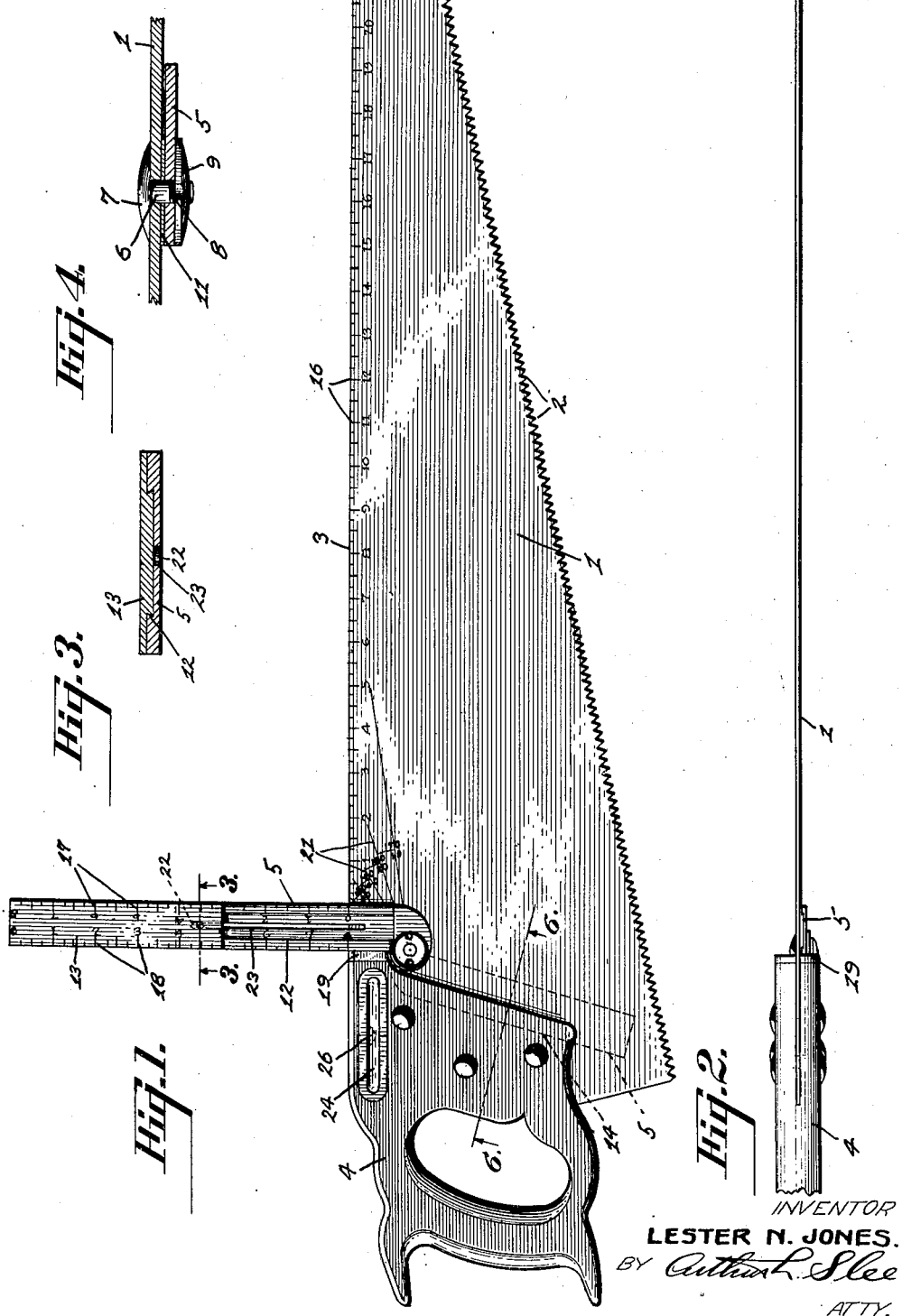
INVENTOR
LESTER N. JONES.
BY Arthur L. Slee
ATTY.

Dec. 1, 1925.

L. N. JONES

CARPENTER'S TOOL

Filed March 3, 1925

INVENTOR
LESTER N. JONES.
BY Arthur L. Slee
ATTY.

Patented Dec. 1, 1925.

1,563,495

UNITED STATES PATENT OFFICE.

LESTER N. JONES, OF LIVINGSTON, CALIFORNIA.

CARPENTER'S TOOL.

Application filed March 3, 1925. Serial No. 12,876.

*To all whom it may concern:*

Be it known that I, LESTER N. JONES, a citizen of the United States, residing in Livingston, county of Merced, and State of California, have invented a new and useful Improvement in a Carpenter's Tool, of which the following is a specification.

My invention relates to improvements in a carpenter's tool wherein the back of a handsaw is arranged to operate in conjunction with an arm mounted in connection therewith to form a square and with a spirit level to form a base for said level whereby the utility of a handsaw, a square, and a level may be obtained from a single tool.

The primary object of my invention is to provide an improved tool for carpenters.

Another object is to provide an improved tool wherein elements are mounted in association with the back of a saw to form a square and a level in combination with the saw.

A further object is to provide an improved tool of the character described which can be used in any of a plurality of ways without impairing the efficiency of the tool in the performance of any particular function thereof.

Another object is to provide a device wherein a member mounted in connection with the blade of a saw and movable to a position adapted to form a square with the back thereof, is adapted to be collapsed and folded to a normally inoperative position held in engagement with the handle of the saw so as not to interfere with the use of the saw as such.

A further object is to provide a device wherein a movable arm is adapted to be extended to form a square with the back of a saw and also adapted to be set in angular relation to the back of the saw for measuring or laying off angles of various degree.

A further object is to provide a saw having a spirit tube mounted in connection therewith and associated with the back of the saw in such manner as to permit the use of the back of said saw as a base for a spirit level.

A still further object is to provide a tool of the character described which can be manufactured economically and which will afford the utility of a plurality of tools without appreciably increasing the bulk of the tool.

I accomplish these and other objects by means of the device disclosed in the drawings forming a part of the present specification wherein like characters of reference are used to designate similar parts throughout said specification and drawings and in which, Fig. 1 is a side elevation of my improved tool showing the square forming member extended to operative position;

Fig. 2 is a plan view of the tool as shown in Fig. 1;

Fig. 3 is a transverse section through the square forming member, taken upon the line 3—3 of Fig. 1 and drawn upon a larger scale;

Fig. 4 is a sectional detail showing the manner in which the square forming member is mounted upon the saw blade;

Figure 5:
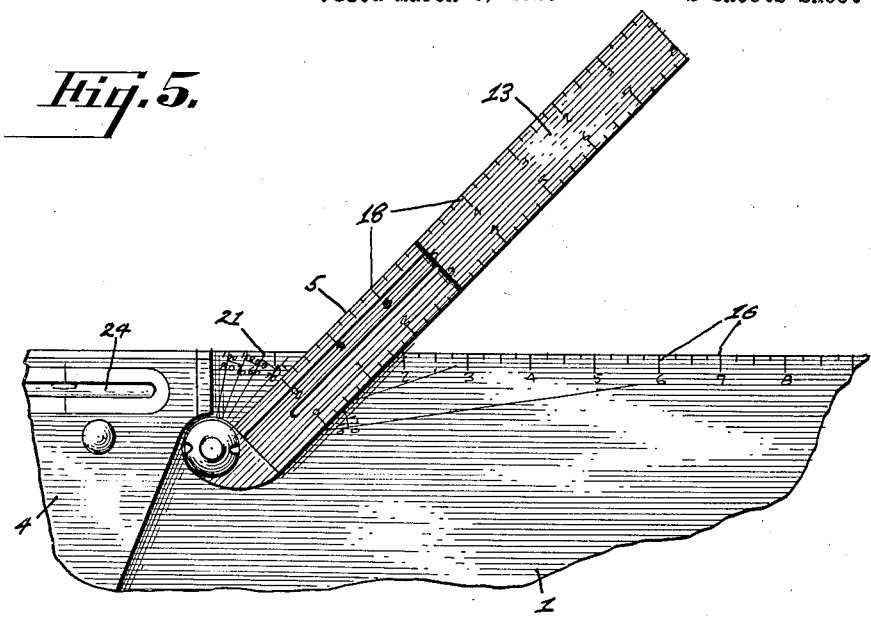
Fig. 5 is a broken side elevation of a portion of the saw showing the square forming member set in angular position.
Figure 6:
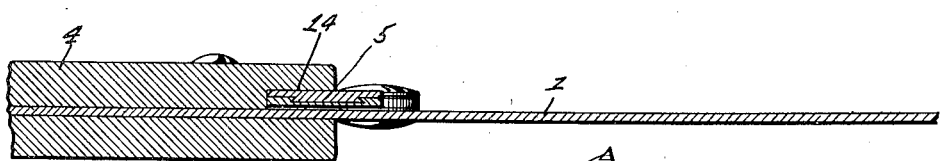
Figure 7:
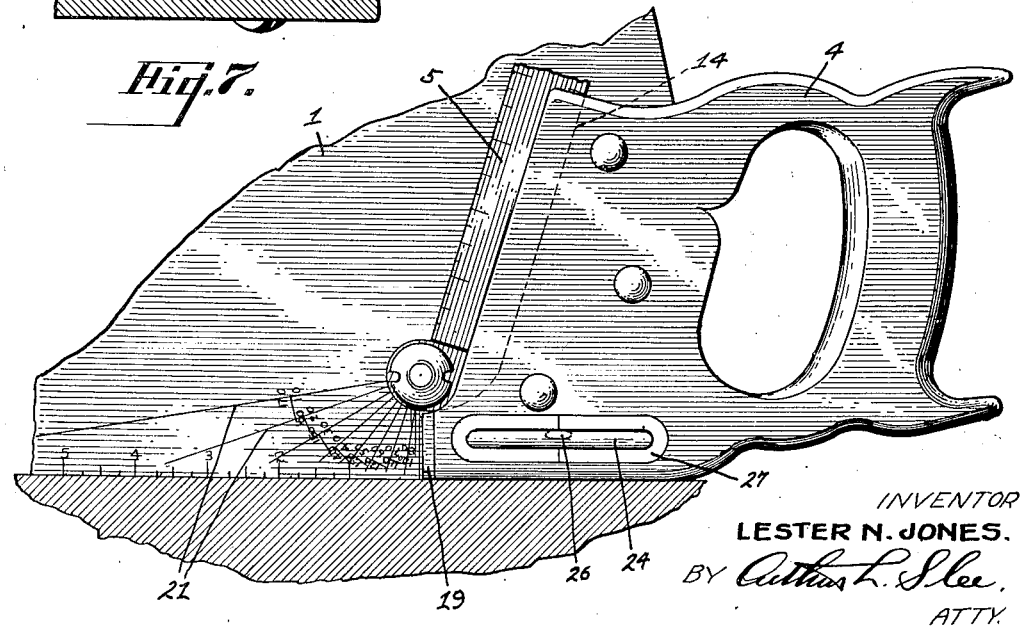

Fig. 6 is a broken sectional detail showing the manner in which the square forming member is folded into engagement with the handle when in inoperative position, the section being taken upon the line 6—6 of Fig. 1; and Fig. 7 is a broken side elevation of the handle portion of the saw showing the manner in which the back of the saw operates as a base for the spirit level mounted in the handle of the saw.

Referring to the drawings the numeral 1 is used to designate in general the blade of a handsaw having the usual saw teeth 2 along the cutting edge thereof and having a straight edge 3 along the back thereof. The saw is provided with the usual handle 4, the top of said handle being arranged in line with the straight edge 3 of the blade.

An arm 5 is pivotally mounted upon the saw adjacent the handle 4, said arm being carried upon a pivot bearing 6 having a large flat head 7 engaging one side of the saw blade and having threads 8 formed upon the opposite end to receive a suitable nut 9 whereby the arm 5 may be held upon the pivot bearing and sufficient pressure applied to cause a frictional resistance to pivotal movement of the arm adapted to hold the arm in any desired position. A thin washer 11 is preferably mounted between the arm 5 and the blade 1 to facilitate the movement of the arm to operative position and to prevent scratching of the blade.

The arm 5 is provided with a longitudinally disposed dovetail groove 12 arranged to receive an extension 13 slidably mounted in engagement therewith. The edges of the extension 13 are arranged to match with the edges of the arm 5. The extension 13 is arranged to normally occupy a position with the outer end of the extension matching with the end of the arm 5 whereby the two may be swung together about the pivot 6 to an inoperative position along the edge of the handle as shown in dotted lines in Fig. 1 of the drawings, the arm being engaged by a groove 14 formed along the adjacent edge of the handle 4 whereby the arm may be held in such manner and position as to permit the use of the saw in normal manner without any interference by the arm 5.

The arm 5 and extension 13 may be moved pivotally to a position extending outwardly at right angles to the back of the saw, and the extension 13 moved outwardly to extended position to form the short arm of a carpenter's square as shown in full lines in Fig. 1 of the drawings. The straight edge back of the blade 1 is graduated in inches as at 16 and the edges of the arm 5 and extension 13 are also graduated in inches as at 17 and 18 in the manner of an ordinary square whereby the saw and arm may be used as a square in place of the square ordinarily forming a part of a carpenter's kit of tools. The graduations of the arm 5 and extension 13 are numbered in reverse order on the opposite edges so that when the extension is in fully extended position the numbering will be in order when read from either end of the extended arm. The movement of the extension 13 relative to the arm 5 is limited by a pin 22 engaging a slot 23 in the back of said arm 5.

A metal abutment 19 is mounted in connection with the handle 4 to define the square forming position of the arm 5 whereby the arm may be accurately positioned at right angles to the back of the saw when it is desired to form a square.

Graduations 21 are formed upon the blade of the saw forward of the arm, said graduations being arranged radially to the pivot point 6 and arranged to indicate various angular settings of the arm 5 whereby said arm and extension may be set to measure or lay off angles of various degrees relative to the back of the saw.

A spirit level is mounted within the handle 4 of the saw, said level consisting of the usual glass tube 24 so filled with a suitable fluid as to show a bubble 26 and mounted within a metal frame 27 set into the handle of the saw. The spirit level is arranged parallel to the straight edged back of the saw so that by placing the back of the saw upon a surface to be leveled, said back will serve as a base for the spirit level as shown in Fig. 7.

In operation the square forming member, consisting of the arm 5 and extension 13, is normally folded into inoperative position in engagement with the groove 14, in which position the arm is entirely out of the way so as to form no interference to the normal use of the saw as such. When it is desired to use the tool as a square, the arm 5 is swung from the normal inoperative position to operative position abutting against the abutment 19 and extending outwardly at right angles to the back of the saw. When only a short square arm is required the arm 5 may be used without moving the extension 13 from normal matching position. When a longer arm is required however, the extension 13 is moved outwardly to extended position thereby doubling the length of the arm. In this position the back of the saw and the arm combine to form a carpenter's square adapted to be used in the ordinary manner.

As a level, the spirit tube is fully protected in its mounting within the handle of the saw and, when the tool is being used as a saw or as a square, does not affect the operation in any manner. When however, it is desired to level a surface, the back of the saw is applied to the surface as a base and the position of the bubble 26 observed in the same manner as the ordinary level.

From the above description and explanation it will be seen that I have provided a new and useful tool embodying the functions and utility of three separate and distinct tools. The specific details of construction are of course subject to modification in various manners without departing from the spirit of my invention. I therefore do not wish to restrict myself to the specific structure disclosed but wish to avail myself of all modifications that may fall within the scope of the appended claims.

Having thus described my invention what I claim as new and desire to secure by Letters Patent is,

1. A carpenter's tool comprising the combination with a handsaw provided with a handle and having a straight edge along the back thereof, of an arm pivotally mounted upon the saw adjacent the handle and normally held in an inoperative position adjacent said handle, said arm being movable to an operative position extending outwardly at right angles to the back of the saw to form a square, and a metal abutment mounted in connection with the handle to limit the movement and to accurately define the operative position of said arm.

2. A carpenter's tool comprising the combination with a handsaw provided with a handle and having a straight edge along the back thereof, of an arm pivotally mounted upon the saw adjacent the handle and normally held in an inoperative position in engagement with a groove formed in the adjacent portion of the handle, said member being movable to an operative position extending outwardly at right angles to the back of the saw to form a square, and a metal abutment mounted in connection with the handle to limit the movement and to accurately define the operative position of said member.

3. A carpenter's tool comprising the combination with a handsaw having a straight edge along the back thereof, of an arm mounted upon the saw and movable to a position at right angles to the back to form a square, and an extension slidably mounted upon said arm for extending the length thereof, when the same is in use as a square.

4. A carpenter's tool comprising the combination with a handsaw having a straight edge along the back thereof, of an arm mounted upon the saw and movable to an operative position at right angles to the back to form a square, and an extension slidably mounted upon the arm for extending the length of said arm when the same is in operative position for use as a square, the edges of the extension matching with the edge of the arm.

5. A carpenter's tool comprising the combination with a handsaw having a straight edge along the back thereof, of an arm mounted upon the saw and movable to an operative position at right angles to the back to form a square, and an extension slidably mounted upon the arm for extending the length of said arm when the same is in operative position for use as a square, the edges of the extension matching with the edges of the arm, and means for limiting the movement of the extension relative to the arm.

6. A carpenter's tool comprising the combination with a handsaw having a straight edge along the back thereof, of an arm mounted upon the saw and movable to an operative position at right angles to the back to form a square, and an extension slidably mounted upon the arm for extending the length of said arm when the same is in operative position for use as a square, the edges of the extension matching with the edges of the arm, and graduations formed upon the edge of the back of the saw and along the edges of the arm and the extension.

7. A carpenter's tool comprising the combination with a handsaw having a straight edge along the back thereof, of an arm mounted upon the saw and movable to an operative position at right angles to the back to form a square, an extension slidably mounted upon the arm for extending the length of said arm when the same is in operative position for use as a square, and graduations formed upon the edge of the back of the saw and upon the edges of the arm and extension, the graduations upon said arm and extension being numbered consecutively when the extension is in extended position.

8. A carpenter's tool comprising the combination with a handsaw having a straight edge along the back thereof, of an arm mounted upon the saw and movable to an operative position at right angles to the back to form a square, an extension slidably mounted upon the arm for extending the length of said arm when the same is in operative position for use as a square, and graduations formed upon the edge of the back of the saw and upon the edges of the arm and extension, the graduations upon said arm and extension being numbered consecutively when the extension is in extended position, and graduations formed upon the blade of the saw to indicate various angular settings for the arm and extension whereby the same may be used for measuring or marking angles relative to the back of the saw.

In witness whereof I hereunto set my signature.

LESTER N. JONES.